March 23, 1954
L. S. WILLIAMS
2,672,695
CAPSULE GAUGE
Filed May 12, 1951
2 Sheets-Sheet 2
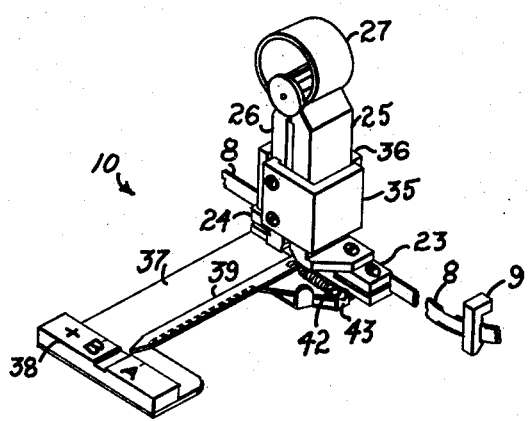
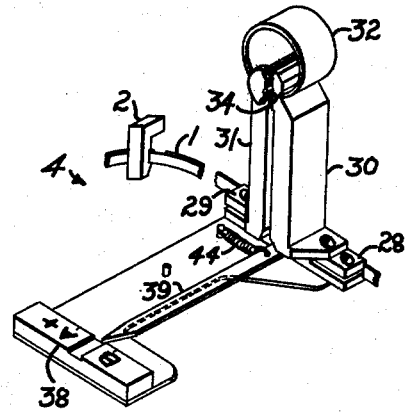
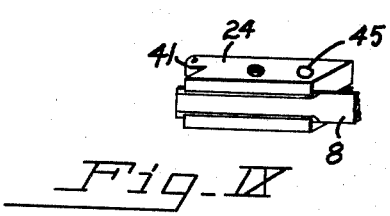
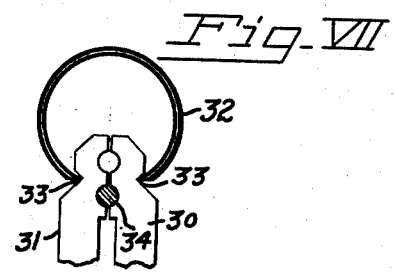
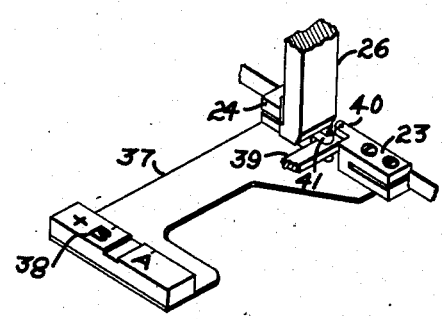
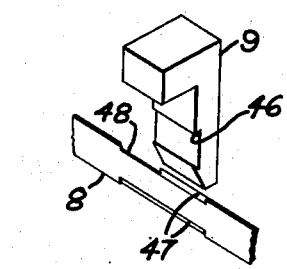
Inventor
LAWRENCE S. WILLIAMS
By Marshall & Marshall
Attorneys Patented Mar. 23, 1954

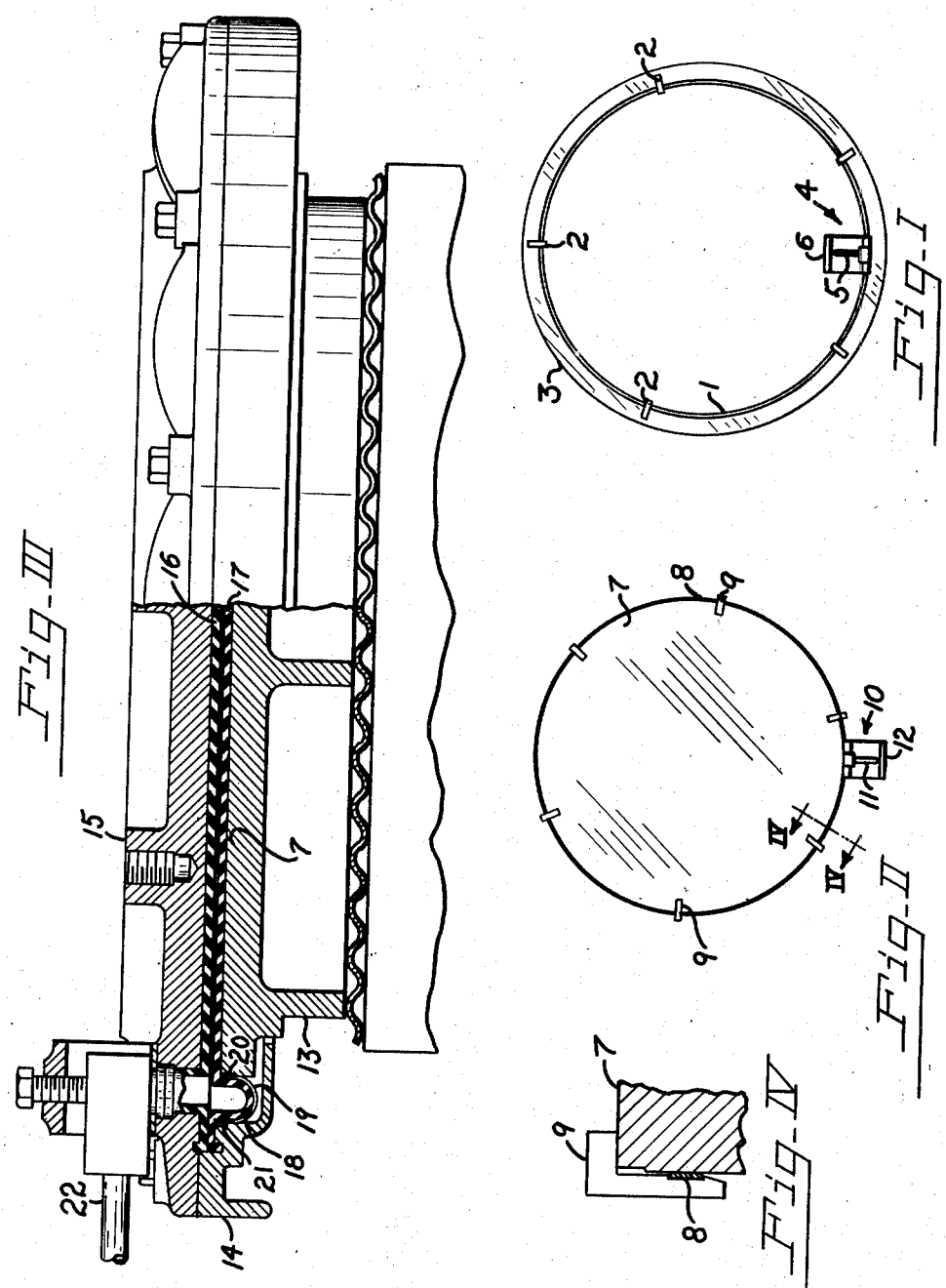

2,672,695

UNITED STATES PATENT OFFICE 2,672,695

CAPSULE GAUGE

Lawrence S. Williams, Toledo, Ohio, assignor to Toledo Scale Company, Toledo, Ohio, a corporation of New Jersey Application May 12, 1951, Serial No. 225,935

5 Claims. (Cl. 33—179)

This invention relates to measuring equipment and in particular to gauges for the measurement of generally circular members the areas of which must be precisely known. In the gauging of machined circular or cylindrical pieces during manufacture it is usually customary to measure their diameters. This is a satisfactory method for most types of parts because they are sufficiently rigid to maintain their shapes and because in most instances, particularly where parts must be fitted together, the diameter of the part is a critical dimension. In the manufacture of hydraulic scales, and in particular those elements called capsules that support the load receiver and convert or translate the load forces into hydraulic pressure, it is necessary not only that the diameters be quite accurate but, more important, it is necessary that the areas of the capsule members be very precisely controlled. It is not necessary that the capsule parts be precisely circular since they may be slightly elliptical and still have the correct area. Such parts may be gauged by measuring their circumferences which, for the small amounts of eccentricity that may be expected, are precisely related to the areas of the members being measured.

The principal object of this invention is to provide gauges adapted to accurately measure the inside or outside circumferences of hydraulic scale parts.

Another object of the invention is to provide gauges for measuring the circumference of a member which gauges have substantially the same temperature coefficient of expansion as the part being measured and which have sufficiently low heat capacity that they reach the temperature of the parts being measured during a measuring operation.

A further object of the invention is to provide a circumference indicating gauge having means for applying a predetermined force to the gauge member conforming to the circumference of the part being measured.

Another object of the invention is to provide locating elements on the gauge for accurately positioning the gauge in measuring relation to the capsule element being measured.

More specific objects and advantages are apparent from the following description of preferred forms of the invention.

According to the invention gauges for measuring generally circular capsule elements are constructed of a thin metallic band the length of which is slightly shorter than the circumference of the part being measured and the ends of which are fitted into a fixture comprising relatively movable resiliently connected members for maintaining force on the band and a pointer for indicating variations in length of the gap between the ends of the metallic band. The invention further includes the provision of a plurality of hooks rigidly attached to and spaced along the band and adapted to position the band on the part being measured.

Preferred embodiments of the invention are illustrated in the accompanying drawings.

In the drawings:

Figure I is a plan view of the improved gauge positioned to measure the smaller or inner circumference of an annular member.

Figure II is a plan view of a similar gauge adapted to measure the outer circumference of a generally circular member.

Figure III is a side elevation, partly in section, of a hydraulic capsule showing the parts to be measured.

Figure IV is a small vertical section showing one of the gauge positioning members.

Figure V is a perspective view of the tensioning and indicating mechanism of the gauge shown in Figure II.

Figure VI is a similar view of the tensioning and indicating mechanism shown in Figure I.

Figure VII is a detailed section of the upper portion of the tensioning member.

Figure VIII is a detailed view showing the cooperation of the fixtures on the ends of the gauge band and the drive for the indicator.

Figure IX is a detailed view of one of the fixtures employed on the end of the band and Figure X is an enlarged isometric view illustrating the method of attaching the positioning elements to the band.

These specific figures and the accompanying description are intended merely to illustrate the invention but not to impose limitations on its scope.

Figure I illustrates a gauge adapted to measure the smaller circumference of an annular member. Such a gauge comprises a thin metallic band 1 which is supported in place against the inner cylindrical surface of the member by the engagements of hooks or guides 2 with a flat surface of an annular capsule member 3. The ends of the band 1 are secured in a gauge 4 having an indicator 5, cooperating with a chart 6, for indicating variations in the circumference of the member 3.

Figure II shows a similar gauge for measuring the outer circumference of a generally circular capsule member 7. This gauge comprises a thin metallic band 8 having a plurality of locating elements or hooks 9 spaced around its periphery and an indicating mechanism 10, including an indicator 11 that cooperates with a chart 12, for indicating variations in the circumference of the member being measured.

Gauges employing flexible metallic bands such as the bands 1 and 8 are particularly well adapted for measuring machined parts, the areas of which must be precise but which may be slightly elliptical. An illustration of such a device is a capsule for hydraulic scales, such as illustrated in Figure III. Such a capsule comprises a base member 13 having an upper flat surface corresponding to the member 7 shown being measured in Figure II. The capsule also includes an annular member 14 which is bolted or otherwise rigidly secured to the under surface of the marginal area of an upper capsule member 15. The space between the upper surface of the base 13 and the upper capsule plate 15 is filled with a hydraulic fluid which is confined by a rubber liner 16 and 17. The lower liner 17 has a bead 18 that fits into a gap left between the rim at the top of the base 13 and the rim of the annular member 14. The bead 18 of the liner 17 is supported against stretching by a basket 19 of a generally semi-torroidal shape comprising a great plurality of narrow, closely spaced metallic bands that are anchored to reinforcing strips 20 and 21. The outer, juxtaposed areas of the liners 16 and 17 are securely clamped together to form fluid tight joints when the annular member 14 is bolted or otherwise secured to the upper capsule plate 15. The hydraulic pressure developed within the capsule is communicated through a pipe 22 to pressure measuring equipment that indicates the load on the scale.

In order that the pressure developed in the capsule be precisely related to the load on the capsule it is necessary that the effective area of the capsule be precisely known. The effective area of such a capsule is the average of a first cross-sectional area lying within the cylindrical outer surface of the base member 13 and a second area lying within the inner cylindrical surface of the annular member 14. These cylindrical surfaces support and define the horizontal position of the thin metallic members or bands supporting the bead of the capsule liner 17. The precise dimensions that must be known to determine the effective area of the capsule are thus the circumferences of the base 13 at the point of support of the basket 19 and of the annular member 14 at the point where it supports the basket 19. The improved gauges are designed to measure the circumference of the members at these points to determine their effective areas.

The improved gauges are shown in considerable detail in Figures V through IX inclusive, thus in Figure V, which shows the gauge attached to measure the circumference of the plate 7, the ends of the thin metallic band 8 are rigidly fastened in fixtures 23 and 24, which fixtures are in turn attached to handle members 25 and 26. The handles 25 and 26, like the legs of a bow compass, are hingedly connected together at their upper ends by a heavy C-shaped spring 27.

The gauge indicator assembly 4 is similarly constructed in that it comprises fixtures 28 and 29 rigidly attached to the ends of the thin metallic band 1. The fixtures, in turn, are attached to handles 30 and 31 which at their upper ends are connected together by a hinge including a heavy C-shaped spring 32. The details of the hinge connections are shown in Figure VII. It will be noted that the handle portions 25 and 30 are alike and that the cooperating handle portions 26 and 31 are also alike so that one set may be interchanged for the other. Referring again to Figure VII, each of the handle portions 30 and 31 has a transverse notch 33 to receive a beveled end of the C-shaped spring 32 and each, on its surface adjacent the other, has a pair of transverse semicylindrical grooves to selectively accommodate a hinge pin 34. If the hinge pin is in the position shown in Figure VII the lower ends of the handle portions 30 and 31 are urged apart so as to separate the ends of the band 1 thus causing the band to expand against the inner circumference of the annular member 3. If the hinge pin 34 is located in the other of the pair of transverse grooves it is within the C-shaped spring 32 so that the spring urges the ends of the handle portions 30 and 31 toward each other, the condition required for the gauge illustrated in Figures II and V.

When the internally expanding gauge 4 is being placed in position to measure an inside circumference the operator merely pinches the handle portions 30 and 31 together against the action of the spring 32 thus shrinking the band 1 enough to allow it to drop into place in the member to be measured.

The externally contracting gauge 10, shown in Figures II and V, differs in that it is fitted with finger portions 35 and 36 so that the operator in grasping and pinching the finger portions together expands the thin metallic band 8 so that it may be dropped into place over the periphery of the plate 7.

Referring now to Figure VIII each of the gauges includes a base plate 37 that is attached to the under surface of the fixture 24 or 29. The other fixtures 23 or 28 are free of the base plate. The base plate 37 also carries a chart portion 38 on an end remote from the fixtures 23 and 24 and an indicator 39, pivotally supported on pivot pins extending through partially overlapping bifurcated ends 40 and 41 of the fixtures 23 and 24, cooperates with the chart 38 to indicate the relative position of the fixtures 23 and 24 with respect to each other and thus the deviation of the circumference of the band 8 from a standard circumference.

A short helical spring 42 (Figure V) connected between the indicator 39 and an upwardly extending tab 43 of the base 37 urges the indicator in a direction that assists the spring 27 in drawing the fixtures 23 and 24 toward each other to tighten the band 8. A similar spring 44 (Figure VI) forces the fixtures 28 and 29 apart so as to aid the spring 32 in enlarging the band 1 to fit the inner circumference of the annular member 3 being measured. In each case the short helical spring urges the indicator to the "A" portion of the chart which in the outside gauge 10 indicates an undersize piece and in the inside gauge mechanism 4 representing an oversize piece. Pieces of correct size cause the indicator to stop opposite the center portion of the chart while an oversize plate 7 or an undersize annular member 3 causes the corresponding indicator to move to a position opposite the "B" portion of the chart 38.

Since the effective area of the capsule is the average of the area of the plate and of the annular member it follows that a correct effective area may be obtained by matching an oversize plate with an undersize ring or vice versa. If the capsule parts are marked according to the indicator readings one may assemble accurate capsules by employing "A" plates with "A" rings since the average area is then correct even though one member was oversize and the other undersize.

The bands 1 and 8 have beveled edges adjacent the ends as seen in Figure IX to fit into dovetail slots in the fixtures 23 and 24 and are secured by use of a cement and by mechanical pressure exerted by a screw extending through a hole 45 and threaded through the lower section of the fixture. The fixture itself is split in a horizontal direction throughout the greater portion of its length so that when the screw is tightened the band 8 is rigidly clamped in place. This illustrates a practical way of attaching the band and providing a structure in which the band is flush with the surface of the fixture so that it may be placed in direct contact with the object being measured.

Likewise the locating members 9 are each provided with a dovetail slot 46 that fit over beveled portions 47 (Figure X) of the thin metallic band 8. The edge of the band 8 has a notch 48 cut in one side so that the locating member 9 may be fitted onto the band 8 by hooking the lower beveled surface of the band 8 into the dovetail notch 46 and then bringing the upper edge of the dovetail notch 46 through the band notch 48 and then sliding the band 8 longitudinally until the beveled edges 47 of the band 8 are engaged in the dovetail slot 46. A cement may be applied to hold the parts in the assembled position.

The thin metallic bands 1 or 8, when the gauges are in use, are subjected to tension or compression stress produced by C-shaped springs 27 or 32 and the indicating springs 42 or 44 so that they closely fit the members being measured. To avoid errors arising from differences in temperature, the thin metallic bands 1 and 8 are made of a material having the same or substantially the same temperature coefficient of expansion as the parts being measured. Furthermore the construction of the indicator portions and the locating members 2 or 9 are such that the band is placed in accurate and intimate contact with the article being measured. This intimate contact in cooperation with the extremely low heat capacity of the thin metallic band allows the band to rapidly come to the same temperature as the part being measured. Since the parts reach substantially the same temperature and have generally equal temperature coefficients of expansion, errors due to changes of dimension with temperature are minimized if not completely eliminated.

Various modifications in details of construction of the parts may be made without departing from the spirit and scope of the invention.

Having described the invention, I claim:

1. In a gauge for measuring the circumference of generally circular bodies the cross-sectional areas of which must be precisely known, in combination, a thin metallic band having a gap, a fitting attached to each end of the band adjacent the gap, a pointer fulcrumed on one of said fittings and pivotally connected to the other, a graduated member fixed to the fitting on which the indicator is fulcrumed, said member cooperating with said pointer to indicate changes in the length of the gap, and spring means connecting said fittings for holding the fittings in alignment and urging them in a predetermined direction parallel to the adjacent portions of the metallic band.

2. In a gauge for measuring the circumference of generally circular metallic bodies the cross-sectional areas of which must be precisely known, in combination, a thin metallic band having the same temperature coefficient of expansion as the body to be measured whereby changes in the area of the body due to temperature changes will be compensated for by a proportional change in the length of the band when said band is in contact with said body, said band having a gap, a fitting on each end of the band adjacent the gap, a pointer fulcrumed on one fitting and pivotally connected to the other for indicating the length of the gap, spring means for holding the fittings in alignment and urging one in a predetermined direction with respect to the other, and means for locating the band on the body to be measured.

3. In a gauge for measuring the circumference of generally circular metallic bodies the cross-sectional areas of which must be precisely known, in combination, a thin metallic band slightly shorter in length than the circumference to be measured, said band having a gap, fitting on each end of the band adjacent the gap, handle means connecting the fittings, said band being flush with the surface of the fittings, and a plurality of hooks attached to the band, said band being recessed into the hooks to be flush with the surface thereof, whereby said band may be suspended from and placed in intimate contact with the body to be measured.

4. In a gauge for measuring the circumference of generally circular bodies the cross-sectional areas of which must be precisely known, in combination, a thin metallic band having a temperature coefficient of expansion generally equal to the temperature coefficient of expansion of the metallic body being measured, said band having a gap, hooks for positioning the band on the body to be measured, said band having a gauge fitting attached to each end of the band adjacent the gap, handle means attached to the fittings, means for holding the fittings in alignment and urging them in a predetermined direction parallel to the adjacent portions of the metallic band, and means for indicating variations in the length of the gap.

5. In a gauge for measuring the circumference of generally circular metallic bodies the cross-sectional areas of which must be precisely known, in combination, a thin metallic band having a temperature coefficient of expansion generally equal to the temperature coefficient of expansion of the metallic body to be measured, said band having a gap and being slightly shorter in length than the circumference to be measured, a fitting on each end of the band adjacent the gap, handle means connecting the fittings, said band being flush with the surface of the fittings, and a plurality of hooks attached to the band, said band being recessed into the hooks so as to be flush with the surface thereof whereby said band may be placed in intimate contact with the body to be measured.

LAWRENCE S. WILLIAMS.

References Cited in the file of this patent

UNITED STATES PATENTS

| Number | Name | Date |
|---|---|---|
| 144,606 | Fenton | Nov. 18, 1873 |
| 380,836 | Warfield | Apr. 10, 1888 |
| 783,562 | Zimmerman | Feb. 28, 1905 |
| 1,334,955 | Johansson et al. | Mar. 30, 1920 |
| 1,419,428 | Ulrich | June 13, 1922 |
| 1,958,864 | Richardson | May 15, 1934 |
| 2,500,313 | Harrington | Mar. 14, 1950 |

FOREIGN PATENTS

| Number | Country | Date |
|---|---|---|
| 593,808 | Germany | Mar. 5, 1934 |